United States Patent
Lyngoe

(10) Patent No.: US 9,733,010 B2
(45) Date of Patent: Aug. 15, 2017

(54) DEFROSTING APPARATUS AND DEFROSTING METHOD

(75) Inventor: Bjarne Lyngoe, Norresundby (DK)

(73) Assignee: GEA FOOD SOLUTIONS BAKEL B.V., Bakel (NL)

(*) Notice: Subject to any disclaimer, the term of this patent is extended or adjusted under 35 U.S.C. 154(b) by 617 days.

(21) Appl. No.: 14/342,819

(22) PCT Filed: Sep. 7, 2012

(86) PCT No.: PCT/EP2012/067505
§ 371 (c)(1),
(2), (4) Date: Apr. 25, 2014

(87) PCT Pub. No.: WO2013/034686
PCT Pub. Date: Mar. 14, 2013

(65) Prior Publication Data
US 2014/0245759 A1 Sep. 4, 2014

(30) Foreign Application Priority Data

Sep. 9, 2011 (EP) ................................. 11007368

(51) Int. Cl.
*F25D 21/00* (2006.01)
*F25D 21/06* (2006.01)
*A23L 3/365* (2006.01)

(52) U.S. Cl.
CPC ............... *F25D 21/06* (2013.01); *A23L 3/365* (2013.01)

(58) Field of Classification Search
CPC ...... F25D 21/06; F25D 2700/16; A23L 3/365; A23L 3/36
See application file for complete search history.

(56) References Cited

U.S. PATENT DOCUMENTS

| | | | |
|---|---|---|---|
| 4,884,626 A | 12/1989 | Filipowski |
| 5,767,487 A | 6/1998 | Tippmann |
| 7,012,229 B2 | 3/2006 | Kim |
| 2004/0052702 A1 | 3/2004 | Shuman et al. |
| 2006/0289529 A1 | 12/2006 | Ito et al. |

(Continued)

FOREIGN PATENT DOCUMENTS

| | | |
|---|---|---|
| CN | 101676416 A | 3/2010 |
| CN | 101940351 A | 1/2011 |
| EP | 0574327 A1 | 12/1993 |

(Continued)

OTHER PUBLICATIONS

Russian Office Action for Application No. 2014113621, dated May 25, 2016.

(Continued)

*Primary Examiner* — Elizabeth Martin
(74) *Attorney, Agent, or Firm* — The Dobrusin Law Firm, P.C.

(57) ABSTRACT

An apparatus that includes a vessel. The vessel is partially filled with a product to be defrosted. The vessel rotates about an inclined axis. The vessel includes means to move the product during defrosting. The apparatus includes a temperature-measurement-means located at partially inside the vessel to determine a surface temperature of the product and a temperature of liquid surrounding the product without contacting the product and without contacting the liquid. The temperature-measurement-means remain stationary while the vessel rotates.

14 Claims, 2 Drawing Sheets

(56) References Cited

U.S. PATENT DOCUMENTS

2011/0033584 A1 2/2011 Bilchinsky et al.

FOREIGN PATENT DOCUMENTS

SU         700090     11/1979
WO    95/04445 A1   2/1995

OTHER PUBLICATIONS

Stephanovskaya N. V. et al., Processes and Apparatuses in Fish Processing Manufacture, M.: "Light Industry and Food Production", 1984, pp. 42-43, drawing 18a.
Chinese Office Action for Application No. 2015060201313270 dated Jun. 5, 2015.
ISR and Written Opinion for application No. PCT/EP2012/067505 mailed Dec. 7, 2012.
IPRP for Application No. PCT/EP2012/067505 mailed Aug. 8, 2013.
European Search Report for Application No. 11007368.1 dated Mar. 26, 2012.

DEFROSTING APPARATUS AND DEFROSTING METHOD

FIELD

The present invention relates to a defrosting apparatus comprising a vessel which is partially filled with the product to be defrosted and which rotates and/or comprises means to move the product during defrosting.

BACKGROUND

Such defrosting apparatus are known from the state of the art and are, for example, so called tumblers or mixers and are e.g. built by the applicant of the present patent application. The product, particularly a food product, is supplied to the vessel in a frozen state, for example at a temperature of −18° C., and is in most cases as large books comprising a multitude of individual chunks, which is subsequently defrosted. During the defrosting, the vessel preferably rotates and/or the product is moved inside the vessel for example by one or more baffles and/or paddles which preferably move relative to the vessel and/or the vessel moves relative to the baffles/paddles. The sidewalls of the vessel and/or the baffles and/or paddles are heated and/or steam is added to the vessel to defrost the product. A liquid, for example a brine, and/or a spice can be added to the product prior and/or during defrosting. During defrosting, the block falls apart into a multitude of smaller chunks. The defrosting apparatus according to the state of the art have, however, the problem that the surface of the products is easily overheated, i.e. partially cooked, during defrosting, which is not desirable and/or that the defrosting apparatus and/or the defrosting process is not energy-efficient.

It was therefore the problem of the present invention to provide a defrosting apparatus and a defrosting process which do not comprise the deficiencies according to the state of the art.

SUMMARY

This problem is solved with an apparatus comprising a vessel which is partially filled with the product to be defrosted and which rotates and/or comprises means to move the product during defrosting, whereas it further comprises a temperature-measurement-means to contact free determine the surface temperature of the product and/or a liquid surrounding the product.

The present invention relates to an apparatus, particularly a defrosting apparatus. Such apparatus are, for example so called tumblers or mixers, and comprises a vessel. The vessel comprises a sidewall, a bottom and top. The bottom and/or the top can be designed as a lid. The center axis of the vessel is preferably inclined relative to a horizontal plane. The angle of inclination is preferably altered based on, for example on the product to be defrosted, the filling degree of the vessel and the condition under which the defrosting takes place. The product, particularly a food product, preferably a meat product is supplied to the vessel in a frozen state, for example at a temperature of −18° C., in most cases as large backs, each preferably comprising a multitude of individual chunks, and subsequently defrosted, i.e. heated, at least at its surface to a temperature >0° C. During the defrosting, the vessel preferably rotates and/or the product is moved inside the vessel for example by one or more baffles and/or paddles which preferably move relative to the vessel and/or the vessel rotates relative to the baffles and/or paddles. The vessel, the baffles and/or paddles can be utilized to massage the product and/or to massage a liquid into the product. The sidewalls of the vessel and/or the baffles and/or paddles are preferably heated and/or steam is added to the vessel to defrost the product. In case steam is added to the vessel, this preferably takes place intermittently. A liquid, for example a brine, and/or a spice can be added to the product before and/or during defrosting. During defrosting, each block preferably falls apart into a multitude of smaller chunks. After defrosting, the product and/or a liquid are removed from the vessel, transported to the next processing step and the vessel is refilled with frozen product and the defrosting restarts.

According to the present invention, the defrosting apparatus comprises temperature-measurement-means to measure the temperature of the surface of the product and/or the surface of a liquid in the vessel without contacting the product, i.e. the temperature-measurement-means is located at least partially inside the vessel, but above the filling level of the product and/or liquid inside the vessel. The temperature measurement means never touch the product. Preferably, the surface temperature of the product and/or the liquid surrounding the product is measured during the entire process, i.e. from the beginning until the end. However during steam injection into the apparatus, the temperature measurement of the surface of the product is most relevant. Preferably, the temperature-measurement-means is mounted at the lid of the vessel. Preferably the temperature-measurement-means remains stationary even if the vessel rotated. Preferably, the reading of the temperature-measurement-means is not influenced by the temperature of the sidewall and or by the temperature of the baffle and/or paddle.

Preferably, temperature-measurement-means is an IR-sensor. More preferably, this IR-sensor has a lense through which the IR-radiation enters into the sensor, which is made from a polymeric-, preferably a pyroelectric-material. Preferably, the IR-sensor has a receiving area which is smaller than 0.01, more preferably <0.008 m².

According to a preferred embodiment, the inventive apparatus comprises vacuum means to apply vacuum to the vessel at least temporarily during the defrosting process. Preferably, this vacuum is at least temporarily smaller than 50 mbar absolute inside the vessel. Preferably. the temperature-measurement-means, particularly the IR-sensor is also, at least partially subjected to the vacuum in the vessel.

In a preferred embodiment, the temperature-measurement-means comprise an electronic component, for example an integrated circuit, which is hermetically sealed from the atmosphere in the vessel. Particularly, the electronic component is not subjected to the same pressure level than the vessel.

According to a preferred embodiment of the present invention, the temperature-measurement-means comprise cleaning means. This cleaning means can be, for example, an air-stream/air-flow that removes particles and or liquid from the sensor, particularly from the tense of the sensor.

The signal from the temperature-measurement-means is transferred to a display and/or a PLC and is preferably utilized to control the defrosting process, at least to trigger an alarm, in case the temperature of the surface of the food block exceeds a certain value The reading of the sensor is preferably averaged over a certain period of time.

Another subject matter of the present invention is a defrosting method for a product in a vessel, whereas steam is added to the vessel, characterized in, that the surface temperature of the product and/or a the surface of a liquid surrounding the product is determined and whereas an alarm is triggered in case the temperature exceeds a certain value and/or whereas the addition of steam is controlled according to the determined temperature.

By means of the inventive method an overheating of the surface of the product is efficiently avoided and/or the defrosting is energy optimized because the product is only heated to a certain temperature and not significantly above this temperature. Since the measurement is contactless, the temperature of the frozen product can be determined right from the start and not only after the product is at least partially surrounded by a liquid. Additionally, the temperature-measurement-means is not damaged by the frozen blocks, particularly in case they move past the temperature-measurement-means.

The disclosure made to inventive apparatus also applies to the inventive method and vice versa.

Preferably, the defrosting is at least temporarily carried out under vacuum.

BRIEF DESCRIPTION OF THE DRAWINGS

The invention is explained according to FIGS. 1 and 2. These explanations do not limit the scope of protection and apply to both embodiments of the present invention

DETAILED DESCRIPTION OF THE DRAWINGS

The present application claims priority to European Patent Application No. EP11007368.1, filed on Sep. 9, 2011 and International Application No. PCT/EP2012/067505, filed on Sep. 7, 2012 both of which are expressly incorporated by herein in their entirety.

Figure 1:
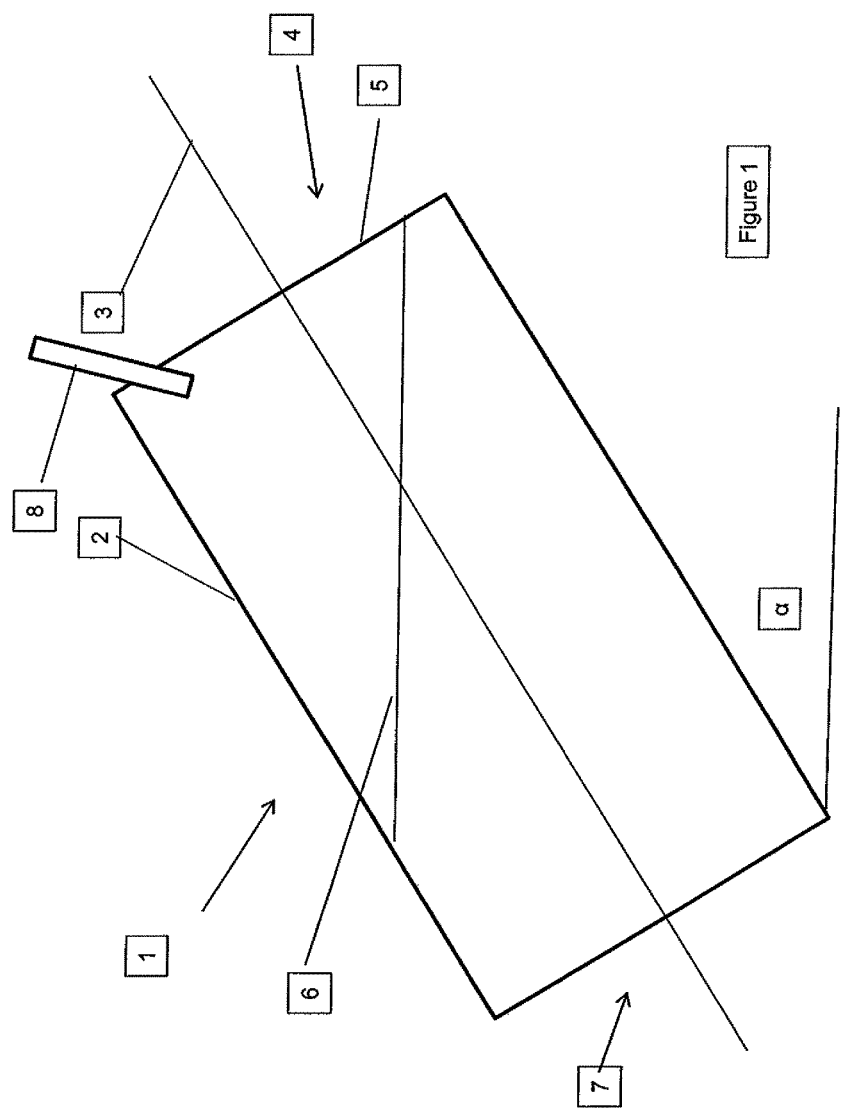
FIG. 1 shows schematically the inventive apparatus.

FIG. 1 shows the inventive defrosting apparatus 1. This apparatus comprises a sidewall 2, here an essentially cylindrical sidewall, and is closes at the bottom 7 and at the top 4. At the top 4, the apparatus comprises here a lid 5, which can be opened and closed to fill and/or empty the vessel. As can be seen, the vessel is preferably inclined by an angle a relative to a horizontal plane. This angle a can be preferably varied. Preferably, the vessel 1, the top 4 and the bottom 7 rotate around an axis of rotation during the defrosting. The sidewall 2 may comprise heating means. Furthermore, the inventive apparatus comprises temperature-measurement-means 8, here an infrared sensor (IR-sensor) 8, which extends at least partially into the apparatus 1, here a vessel. The temperature-measurement-means 8 is preferably mounted to the apparatus such that it remains stationary even in case the apparatus rotates. As can also be seen, the temperature-measurement-means 8 is situated above the filling level 6 of the apparatus 1. Thus the temperature-measurement-means 8 does not touch the product and/or a liquid that surrounds the product to be defrozen. The temperature-measurement-means 8 reads the temperature of the product and/or the surface of the liquid surrounding the product. The apparatus 1 preferably comprises baffles and/or paddles inside the apparatus 1 to stir the product during defrosting and/or to transfer heat to the product in case the baffles/paddles are heated. Furthermore, the sidewall, the bottom and/or the top can comprise heating means in order to transfer heat from the shell of the apparatus to the product. Preferably, the apparatus comprises steam injection means to inject steam into the apparatus 1 in order to facilitate and/or improve the defrosting process.

Preferably, vacuum is applied to the apparatus during defrosting, which means that the temperature-measurement-means 8 is also at least partially subjected to vacuum.

In order to defrost the product, it is filled batch-wise, preferably as large blocks, which comprise a multitude of smaller chunks into the apparatus 1. Then, preferably under rotation of the apparatus, heat is added to apparatus by heating the shell of the apparatus and/or by injecting steam into apparatus. During the defrosting, preferably, a certain level of vacuum is maintained inside of the apparatus, particularly to avoid overheating of the surface of the product to be defrozen. The temperature-measurement-means 8 measures continuously or semi-continuously the temperature of the surface of the product and/or the surface of a liquid surrounding the product. However, the temperature-measurement-means 8 is never in direct contact with the product and/or a liquid surrounding the product. In case the temperature of the product and/or the liquid exceeds a certain level, at least an alarm is set off. Preferably, the addition of steam and/or the vacuum-level are controlled by the reading of the temperature-measurement-means 8. During the defrosting, the product blocks preferably fall apart into a multitude of smaller chunks.

Figure 2:
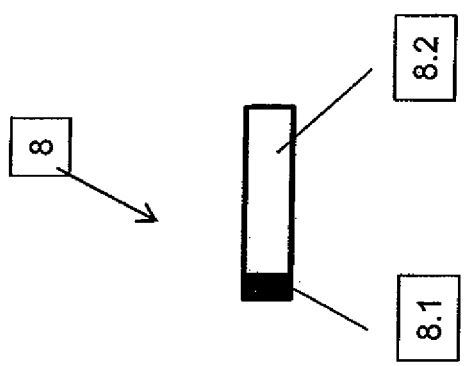
FIG. 2 shows schematically the sensor.

FIG. 2 depicts the temperature-measurement-means 8, here an IR-sensor. The sensor comprises a lense 8.1 through which the R-radiation enters into the sensor, which is made from a plastic material, particularly a material that is shock resistant and/or does not break even under extreme operation conditions. Additionally, the temperature-measurement-means 8 comprises electronic components 8.2, which are hermetically sealed such, that the electronic components are not subjected to the same degree of vacuum as the apparatus 1 and that the pressure around the electronic components does not change even if the inside of the apparatus is subjected to vacuum.

The invention claimed is:

1. An apparatus comprising:
a vessel, the vessel is partially filled with a product to be defrosted, the vessel rotates about an inclined axis, the vessel comprises means to move the product during the defrosting, and
a temperature-measurement-means to determine a surface temperature of the product located inside the vessel without contacting the product and to determine a temperature of liquid surrounding the product inside the vessel without contacting the liquid,
wherein the temperature-measurement-means is located partially inside the vessel and remains stationary while the vessel rotates.

2. The apparatus according to claim 1, wherein the temperature-measurement-means is an IR-sensor.

3. The apparatus according to claim 2, wherein the IR-sensor has a receiving area that is smaller than 0.008 m$^2$.

4. The apparatus according to claim 1, wherein the temperature-measurement-means has a plastic-lense.

5. The apparatus according to claim 1, wherein the apparatus comprises vacuum means to apply vacuum to the vessel.

6. The apparatus according to claim 1, wherein the temperature-measurement-means is subjected to vacuum.

7. The apparatus according to claim 1, wherein the temperature-measurement-means comprise electronic components which are hermetically sealed from the atmosphere in the vessel.

8. The apparatus according to claim 1, wherein the temperature-measurement-means is located above a filling level of the product and the liquid inside the vessel.

9. The apparatus according to claim 1, wherein the vessel comprises a lid, and the temperature-measurement-means is mounted at the lid.

10. The apparatus according to claim 1, wherein the vessel comprises a sidewall and a baffle and/or paddle, and
    wherein a reading of the temperature-measurement-means is not influenced by a temperature of the sidewall, the baffle and/or the paddle.

11. The apparatus according to claim 1, wherein the temperature-measurement-means comprises a cleaning means that removes particles from a lense of the temperature-measurement-means.

12. The apparatus according to claim 1, wherein a signal from the temperature-measurement-means is transferred to a PLC and is used to control the defrosting.

13. The apparatus according to claim 1, wherein during the defrosting, vacuum is maintained inside the vessel by vacuum means to avoid overheating of a surface of the product.

14. An apparatus comprising:
    a vessel, the vessel is partially filled with a product to be defrosted, the vessel rotates about an inclined axis relative to a horizontal plane, the vessel comprises a means to move the product during defrosting;
    an IR-sensor, the IR-sensor determines a surface temperature of the product during the defrosting without contacting the product, the IR-sensor also determines a temperature of liquid surrounding the product during the defrosting without contacting the liquid, the IR-sensor is mounted to a lid of the vessel and is located partially inside the vessel and above a filling level of the product and the liquid inside the vessel, the IR-sensor remains stationary while the vessel rotates about the inclined axis, and a signal from the temperature-measurement-means is transferred to a PLC and is used to control the defrosting;
    a cleaning means to remove particles from a tense of the IR-sensor; and
    a vacuum means to apply and maintain vacuum to the vessel during the defrosting to avoid overheating of a surface of the product.

* * * * *